United States Patent Office 3,350,460
Patented Oct. 31, 1967

3,350,460
METHOD FOR THE PREPARATION OF GLYCEROL ALPHA ETHERS AND THIO ETHERS
Vincent Lamberti, Teaneck, N.J., assignor to Lever Brothers Company, New York, N.Y., a corporation of Maine
No Drawing. Original application Mar. 13, 1963, Ser. No. 264,772. Divided and this application June 6, 1966, Ser. No. 568,085
9 Claims. (Cl. 260—609)

This is a divisional application of Ser. No. 264,772, filed Mar. 13, 1963.

This invention relates to an improved method for the manufacture of alkyl glycerol ethers and to intermediate compounds prepared during this process.

Alkyl glycerol ethers or more specifically 3-alkoxy-1,2-propane diols have become increasingly important in recent years as additives in soaps and synthetic detergent preparations since many of the ethers function as suds-boosters and lime-soap dispersants. These compounds have been prepared by condensing alcohols with epichlorohydrin to produce the 1-chloro-3-alkoxy-2-propanol derivatives and then heating with aqueous sodium carbonate or sodium bicarbonate to yield the desired alkyl glycerol ether.

However, this prior art process suffers from a number of disadvantages. When higher alkyl ethers of the type $ROCH_2CH(OH)CH_2Cl$ are heated with alkaline agents such as sodium carbonate to replace the chlorine group with a hydroxyl group, a poor yield of the hydroxy ether is obtained which is apparently caused by side reactions forming undesirable polyethers and glycidyl ethers. For example, when lauryl chlorohydroxy glycerol ether is heated with sodium bicarbonate or sodium carbonate, relatively poor yields of the desired glycerol ether ranging from 42% to 52% are obtained due to these side reactions.

An additional disadvantage which is evident with the aforementioned prior art processes is the requirement that organic solvents be used to separate the ether from the inorganic salts mixed therewith. Since the ethers, particularly the lower alkyl glycerol and thio-glycerol ethers, are at least partly soluble in water, washing the ethers to remove the soluble salts would result in a loss of some of the ether. Consequently, when organic solvents are used for this separation, the solvents represent an additional expense as well as being a fire and health hazard.

It is an object of this invention to develop a process for manufacturing glycerol ethers in high yields.

Another object is to develop a method of preparing glycerol ethers which does not require organic solvents.

Still another object of the invention is to prepare intermediates which are useful in forming glycerol ethers.

These and other objects and advantages are obtained by a two-step process which involves first reacting an ether of glycerol alpha-halohydrin with a soap and thereafter hydrolyzing the intermediate ester to produce the desired glycerol ether.

A number of advantages are obtained by this process. First, the desired glycerol ethers are obtained in highly satisfactory yields. Secondly, no organic solvents are required to separate the ether from inorganic salts mixed therewith. Thus, after the first step of the process, the insoluble intermediate esters may be washed with water to remove soluble salts such as sodium chloride. Thirdly, the hydrolysis step yields the desired glycerol ether in combination with a soap. The presence of soap in the final product may be advantageous and desirable in many instances. For example, when the ether is to be added to a soap bar, the soap which is mixed with the ether may advantageously be utilized as part of the bar.

The first step of the method of this invention involves the reaction of a glycerol alpha-halohydrin ether with a salt of a long-chain fatty acid. The glycerol alpha-halohydrin ether may conveniently be prepared by a number of methods which are well known to those skilled in the art. A preferred procedure is to condense an alcohol or thio-alcohol with an epihalohydrin in the presence of stannic chloride as a catalyst. Depending upon the proportions of reactants and the reaction conditions, the product is generally a mixture of monomeric and polymeric haloglycerol ethers.

The hydrocarbon radical of the ether may be derived from any alcohol whether short-chain or long-chain or straight or branched chain. Mixtures of alcohols such as those derived from fats, oils and the Oxo process may be employed. Long-chain secondary alcohols prepared by the hydration of long-chain alpha-olefins (derived from cracked waxes, ethylene polymerization or dehydration of primary alcohols) are also suitable for use in the process of this invention. Specific examples of alcohols which may be utilized to prepare the glycerol alpha halohydrin ether starting materials for the present process include butanol, octanol, and myristyl, cetyl, tallow, lauryl, stearyl and tridecyl alcohols as well as alcohols derived from coconut oil.

Moreover, since this invention is applicable to the sulfur analogues, thio-alcohols can also be utilized. For example, alkyl thio-ethers of the formulas:

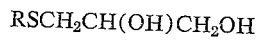

and

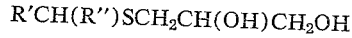

are well suited to the method of this invention. The mercaptans required to prepare these thio-ethers are readily available.

The ether starting materials are reacted preferably under essentially anhydrous conditions with salts of long-chain fatty acids in the first step of the process of the present invention. Alkali metal soaps such as those of sodium and potassium are preferred for use as the reactant in the first stage. Thus, sodium coconut soap, potassium coconut soap and a mixed sodium tallow soap-sodium coconut soap can be utilized. However, it is to be recognized that other salts of long-chain fatty acids containing from about 8 to about 18 carbon atoms may be used including alkaline earth metal salts as long as the objectives of preparing a water-insoluble ester of the glycerol halohydrin ether is fulfilled. Ammonium and amine soaps cannot be used since amide formation predominates under the reaction conditions of the process.

It is preferred to dry the soap so that it contains less than about 2% moisture. In this manner troublesome foaming in the reaction medium is eliminated during the first stage of the reaction.

It is possible to generate the soap in situ, for example by the slow addition of a concentrated aqueous solution of an alkali metal hydroxide to a mixture of an alkoxy-halopropanol and the desired fatty acid at reaction temperatures. However, this procedure requires extreme care in flashing off the water without foaming the mass out of the reactor. The in situ method is particularly suitable to a continuous process wherein a stream of the aqueous alkali and a stream of the haloglycerol ether mixed with the fatty acid are brought into intimate contact in a reaction zone in the form of a thin film and then allowed to flash into a receiver either at atmospheric pressure or under a vacuum.

The ratio of soap to haloglycerol ether must be carefully controlled for optimum results. Generally, a ratio of about 1.0 mole of ether to about 1.1 mole of the soap component is employed. The use of higher ratios can lead to emulsion difficulties during the subsequent separation of inorganic salts from the intermediate esters.

However, the amount of excess soap permissible depends upon the chain length of the soap utilized. Where the salt is not to be separated from the intermediate ester, any amount of excess soap may be used subject to the limitation that the reaction mass must remain sufficiently fluid to allow for adequate mixing.

It is further observed that the ratio of soap utilized is to some extent also dependent upon the mole ratio of epihalohydrin to alcohol used in preparing the starting glycerol ether. The reaction of alcohols with excess epihalohydrin leads to the formation of polymeric haloglycerol ethers as well as monomeric materials. These mixed haloglycerol ethers can also be used as the starting material in the present method. The amount of soap that may be used without encountering subsequent emulsion difficulties is determined by the original ratio of haloglycerol to alcohol used. For example, a chloroglycerol ether derived from 1.3 moles of epichlorohydrin and 1.0 mole of an alcohol would require for optimum yield a minimum of about 1.3 moles of soap. The requisite mole ratios can readily be determined by those skilled in the art subject to the conditions discussed above.

The temperature of the initial reaction should be selected to provide a reasonable reaction time. The soap is preferably in powdered form and it is important that it be added to the haloglycerol ether at a temperature sufficiently high so that the mixture remains fluid. It has been found that the starting ether should be heated to at least about 100° C. before adding the soap in order to avoid gelling and the production of an unmanageable pasty mass. As the temperature is raised, the reaction mixture becomes more fluid and mobile and homogeneous in appearance. A suitable range of reaction temperatures is about 160°–260° C. with the most practical temperatures being in the range of about 180°–220° C.

When relatively high reaction temperatures are employed, there is a tendency for the product to become dark as a result of oxidation. An inert atmosphere such as a nitrogen blanket is thereupon utilized to achieve a light-colored product for conversion into the desired alkyl glycerol ethers. Where the final product is to be subsequently incorporated into a soap bar, it is essential that the formation of darkened products be avoided.

The intermediate esters produced by the process of the invention are of the formula

or $RSCH_2CH(OH)CH_2OCOR_1$ wherein R is an organic radical derived from an alcohol or thioalcohol and $R_1$ is a radical derived from a fatty acid. These esters are novel compounds and may be separated from the salts formed during the reaction by washing with water. One of the advantages of the invention is that the intermediate esters are water-insoluble and may be washed with water without fear of losing a portion of the product.

The optimum amount of wash water to be used is such that the concentration of dissolved NaCl removed from the esters is about 2 to 3%. The temperature of the separating mass during the washing step should be in the range of about 55°–65° C. for optimum results. If these conditions are followed, a rapid and substantially complete separation of the salts from the intermediate esters is effected.

It is to be noted, however, that separations involving water have been carried out wherein the NaCl concentration in the wash water was about 1–15% and also at room temperature. Thus, the particular conditions surrounding the aqueous separation of the organic esters are subject to many variations. The optimum conditions of separation are dependent upon a number of factors including temperature, the density of the ester relative to the density of the salt solution, the type and amount of excess soap present, etc. Those skilled in the art would readily be able to determine the most suitable conditions for optimum results.

While removal of salts such as sodium chloride by washing the intermediate ester is the preferred form of this invention, there may be applications for the crude unpurified product. Thus, the invention should not be construed as limited to the purification and removal of salts mixed with the intermediate esters since the salts may be left in the final product.

The second critical step of the method of the invention involves hydrolysis of the intermediate esters under alkaline reflux conditions at prevailing pressures. Effective hydrolyzing agents include ammonium hydroxide, alkali metal and alkaline earth metal hydroxides and organic amines such as monoethanolamine. When a 7–10% aqueous alkali solution is employed, products are produced which flow readily while hot and are similar to kettle soap in handling properties. Higher concentrations of alkali can be employed although difficulties are experienced particularly when using higher fatty acid soaps in the process.

The temperature of hydrolysis is not critical and optimum conditions can readily be ascertained. Generally, the intermediate esters and aqueous alkali are heated at reflux temperatures although temperatures of about 60°–110° C. at atmospheric pressure have been used to form the mixture of soap and the desired alkyl glycerol ether.

The following examples illustrate the use of this process according to the invention. It will be understood however, that these examples are included merely for purposes of illustration and are not intended to limit the scope of the invention as described herein, unless otherwise specifically indicated.

*Example A*

The ethers of the invention are prepared in the following working examples from 1-chloro-3-alcoholoxy-2-propanol compounds or the corresponding thio-analogues. The latter materials were prepared in the following manner. One mole of the alcohol and 2 grams of $SnCl_4$ were mixed and heated to 90° C. Then, 1.1 moles of epichlorohydrin were slowly added while stirring the reaction mixture and maintaining the reaction temperature at 90° C. After the addition of epichlorohydrin was complete, the reaction temperature was held at 90° C. for an additional hour. The product was then ready for use as described in the examples below. Alternatively, the product may first be washed with water to remove the $SnCl_4$ catalyst. Either procedure is satisfactory.

*Example 1*

A mixture of 141.8 grams (0.5 mole) of 1-chloro-3-dodecyloxy-2-propanol (M.W. 283.5) and 159.0 grams (0.57 mole) of an anhydrous, powdered mixture of sodium tallow soap and sodium coconut soap (M.W. 279) was gradually heated to 200° C. under a nitrogen blanket with agitation. After 2 hours at this temperature, the reaction mixture was cooled to 140° C. Then, 24 grams (0.6 mole) of sodium hydroxide in 250 grams of water were added and the mixture heated at 104° C. for one hour. The product, 571 grams, contained 20.64% lauryl glycerol ether (M.W. 265; starting with commercial grade lauryl alcohol, M.W. 191) corresponding to a yield of 89.0% of theoretical. The product also contained 2.98% ionic chlorine (corresponding to 4.91% NaCl) and 3.22% total chlorine (organic and inorganic) indicating substantially complete reaction.

*Example 2*

85.1 lbs. (0.30 lb. mole) of 1-chloro-3-dodecyloxy-2-propanol was charged to a 100 gal. glass-lined reactor and heated to 140° C. under a nitrogen blanket with agitation. Then, 87.5 lbs. (0.314 lb. mole) of anhydrous, mixed sodium tallow soap-sodium coconut soap were added and the mixture brought to 200° C. with continued agitation. After a 2-hour reaction time at 200° C., the mixture was cooled to 90° C. and mixed with 742 lbs. of water. After settling, the salt-water layer was separated. The upper ester layer, 175 lbs., contained 11.5% water and 0.30% sodium chloride. Thus, about 97% of the theoretical NaCl formed in the reaction was removed by the water wash.

Sixty lbs. of the crude ester obtained above were hydrolyzed with 4.5 lbs. of NaOH in 40 lbs. of water by heating at 100° C. for 1 hour in a heavy duty Winkworth mixer. Additional water was added during the hydrolysis to maintain fluidity. 95 lbs. of product were obtained analyzing as 26.08% lauryl glycerol ether (M.W. 265) corresponding to a yield of 90.9% of theoretical. The product also contained 40% water, 24.7% soap and only 0.25% NaCl.

*Example 3*

146.2 grams (0.5 mole) of 1-chloro-3-dodecyloxy-2-propanol were heated to 105° C. with agitation. 148.8 grams (0.6 mole) of potassium coconut soap containing less than 1% $H_2O$ were added and the reaction mass placed under a nitrogen atmosphere. The temperature was then raised to 200° C. and held at that temperature for two hours. The product was then cooled to 80° C., the nitrogen blanket removed, and 24 grams (0.6 mole) of sodium hydroxide in 238 grams of water were added. The mixture was heated to reflux (105° C.) and held at that temperature for two hours. By this method there was obtained 551 grams of product containing 21.3% lauryl glycerol ether (M.W. 274; starting alcohol M.W. 200), 35.2% water and 3.54% ionic chloride. This corresponds to a yield of 85.7% of theoretical.

*Example 4*

The same conditions were used as in Example 3 except that the esterification with potassium coconut soap was carried out over a 4-hour period. Yield of lauryl glycerol ether: 87.8%.

*Example 5*

6.0 lbs. of 1-chloro-3-tridecyloxy-2-propanol (prepared from 1.3 moles of epichlorohydrin per mole of tridecyl alcohol) and 6.77 lbs. of anhydrous mixed sodium tallow soap-sodium coconut soap (M.W. 279) were charged to a stainless steel reactor and heated to 395° F. After one hour at 390–395° F., the reaction mixture was cooled to 185° F. and mixed with 54 lbs. of water. After settling and separating the lower salt water layer (50.9 lbs.; 2.31% NaCl), there was obtained as the upper layer 14.35 lbs. of crude ester containing 20.5% water and 0.43% NaCl.

14 lbs. of the crude ester was mixed with a solution of 1.02 lbs (0.0255 lb. mole) of sodium hydroxide in 11 lbs. of water and refluxed for one hour. There was obtained 23 lbs. of product analyzing as follows: 20.5% tridecyl glycerol ether (calculated at M.W. 274), 0.38% NaCl, 49.3% water with the balance being soap (by difference). This corresponds to an 86% yield.

*Example 6*

2551.5 grams (9.0 moles) of 1-chloro-3-dodecyloxy-2-propanol were heated to 140° C. under nitrogen with agitation. Then, 2862 grams (10.23 moles, M.W. 279) of mixed sodium tallow soap-sodium coconut soap (99.7% active) were added and the temperature raised to 200° C. Samples were withdrawn at half-hour intervals and titrated for ionic chlorine to determine the rate of the reaction. From the data below it is seen that the reaction is substantially complete in less than one hour:

| Reaction time at 200° C. (hrs.): | Percent Cl⁻ |
|---|---|
| 0 | 5.86 |
| 0.5 | 6.01 |
| 1.0 | 6.30 |
| 1.5 | 6.07 |

*Example 7*

2246 grams of 1-chloro-3-tridecyloxy-2-propanol (7.68 moles, M.W. 292.5) were heated to 140° C. under nitrogen with agitation. Then, 2440 grams (8.62 moles, M.W. 279) of mixed sodium tallow soap-sodium coconut soap (98.5% active) were added and the temperature raised to 200° C. Samples were withdrawn at half-hour intervals and titrated for ionic chlorine to determine the rate of the reaction. The reaction appears substantially complete in less than one hour at 200° C.:

| Reaction time at 200° C. (hrs.): | Percent Cl⁻ |
|---|---|
| 0 | 5.54 |
| 0.5 | 6.03 |
| 1.0 | 6.06 |
| 1.5 | 6.08 |

*Examples 8–12*

Examples 8–12 were carried out in the following general way:

1.0 mole of the 1-chloro-3-alkoxy-2-propanol prepared as described previously was mixed with sufficient dried powdered soap (ca. 14 grams; containing less than 2% water) to neutralize residual $SnCl_4$ catalyst and then heated under a nitrogen blanket with stirring to 140° C. The remainder of the soap (total: 1.1 moles) was then added and the mixture heated to 200° C. After one hour of reaction at 200° C., the product was cooled to 100° C. 2128 grams of water at 60° C. was added, the mixture stirred for fifteen minutes and then allowed to stand to settle the lower aqueous NaCl layer. The temperature during separation was about 55–65° C.

The crude intermediate ester (1.0 mole) which separated in the above procedure as an upper liquid organic layer and 1.1 moles of a 7% aqueous sodium hydroxide solution were mixed and heated for one hour at 100° C. The mixture was then cooled and analyzed for alkyl glycerol ether content by periodic acid titration and residual NaCl content by the Volhard method. The results are tabulated below:

| Ex. | 1-chloro-3-alkoxy-2-propanol: ROCH₂CH(OH)CH₂Cl | Soap Used To Prepare Intermediate Ester: ROCH₂CH(OH)CH₂OCR'‖O | Alkyl Glycerol Ether Product | | | |
|---|---|---|---|---|---|---|
| | | | Percent Active | M.W. | Percent NaCl | Percent Yield [4] |
| 8 | R—Butyl | Mixed sodium tallow soap-sodium coconut soap (M.W. 279). | 7.1 | 148 | 0.89 | 90.9 |
| 9 | Octyl | do | 12.8 | 204.0 | 0.10 | 87.2 |
| 10 | Myristyl [1] | do | 18.5 | 289.3 | 0.36 | 89.2 |
| 11 | Cetyl [2] | do | 22.4 | 316.2 | 0.26 | 93.0 |
| 12 | Tallow [3] | Sodium coconut soap (M.W. 234). | 26.6 | 337.4 | 0.12 | 94.6 |

[1] Derived from commercial myristyl alcohol, "Adol 18."
[2] Derived from commercial cetyl alcohol, "Adol 52."
[3] Derived from commercial tallow alcohol, "Adol 63."
[4] Based on starting alcohol.

Example 13

151 g. (0.542 mole, M.W. 278.5) of 1-chloro-3-sec.-dodecyl-2-propanol (derived from secondary dodecanols prepared by the hydration of 1-dodecene) were heated to 140° C. under nitrogen with agitation. Then 167 g. (0.596 mole, M.W. 279) of mixed sodium tallow soap-sodium coconut soap (99.5% active) were added and the temperature raised to 200° C. and held at that temperature for one hour. The product was then cooled to 95° C. and mixed with 1152 g. of water at 65° C. After settling, the salt-water layer was separated. The upper ester layer, 563 g., was then hydrolyzed with 342 g. of 7% NaOH by heating at 103° C. for one hour under agitation. The product, 905 g., analyzed as 12.9% active (M.W. 260) and 0.52% ionic chlorine. This corresponds to a yield of 83.0% of the theoretical.

Example 14

1-chloro-3-dodecylmercapto-2-propanol, prepared according to Example A above using n-dodecyl mercaptan in place of the primary alcohol, was reacted with mixed sodium tallow soap-sodium coconut soap as described in Examples 8–12 for the corresponding 1-chloro-3-alkoxy-2-propanol compounds. The dodecyl thioglycerol ether product was obtained in quantitative yield and contained only 0.7% ionic chlorine.

Example 15

1-chloro-3-dodecyloxy-2-propanol, 283.5 g. (1.0 mole), was reacted with 3.21 g. (0.55 mole) of calcium stearate at 200° C. for three hours under nitrogen and with agitation. A portion of the crude ester, 296 g., was hydrolyzed with 314 g. of 7% NaOH for two hours at 103–4° C. The product, 610 g., analyzed as 14.0% lauryl glycerol ether (M.W. 265) or 65.7% of the theoretical.

Example 16

The washed ester, 389 g., derived from 0.50 mole of 1-chloro-3-dodecyloxy-2-propanol and 0.55 mole of mixed sodium tallow soap-sodium coconut soap according to the procedure of Examples 8–12 was hydrolyzed by adding 314 g. of 7% NaOH and heating under agitation at 60–70° C. for 2.5 hours. The product, 693 g., analyzed as 15.3% lauryl glycerol ether (M.W. 265) and 0.32% ionic chlorine. This corresponds to 80.0% of the theoretical yield.

Example 17

The washed ester, 390 g., derived from 0.50 mole of 1-chloro-3-dodecyloxy-2-propanol and 0.55 mole of mixed sodium tallow soap-sodium coconut soap according to the procedure of Examples 8–12 was hydrolyzed with calcium hydroxide by adding a mixture of 15.4 g. of calcium oxide (CaO) in 204.6 g. of water and heating under agitation at 103° C. for three hours. The product, 607 g., analyzed as 18.4% lauryl glycerol ether and 0.35% ionic chlorine. This corresponds to 84.3% of the theoretical yield.

It will occur to those skilled in the art that there are many modifications to the invention as specifically described herein. It is intended to include all such modifications within the scope of the appended claims.

I claim:

1. A method for the preparation of alpha-substituted glycerol ethers and thioethers which comprises: (1) reacting an ether of a glycerol alpha-chlorohydrin with an alkali metal or alkaline earth metal salt of a long chain fatty acid and (2) thereafter heating the product with an alkaline agent to effect hydrolysis.

2. A method which comprises reacting at an elevated temperature and under substantially anhydrous conditions a compound of the formula $RXCH_2$—$CHOH$—$CH_2Cl$ with an alkali metal or alkaline earth metal salt of a fatty acid having from about 8–18 carbon atoms and hydrolyzing the product with an alkaline agent to yield an ether of the formula $R$—$X$—$CH_2$—$CHOH$—$CH_2OH$, R being an aliphatic radical and X selected from the group consisting of —O— and —S— radicals.

3. A method for the preparation of alpha-substituted glycerol ethers which comprises: (1) heating an alkyl ether of glycerol alpha-chlorhydrin with an alkali metal soap having from about 8 to about 18 carbon atoms, (2) washing the product with water to remove soluble salts therefrom and (3) heating the washed product with an alkali metal hydroxide to yield the desired ether.

4. A method which comprises heating about 1 mole of a 1-chloro-3-alkoxy-2-propanol with about 1.1 moles of a substantially anhydrous alkali metal soap containing about 8–18 carbon atoms at a temperature of about 160°–260° C. in an inert atmosphere to form an intermediate ester, and heating the intermediate with an aqueous alkali metal hydroxide to produce 3-alkoxy-1,2-propanediols.

5. A method according to claim 4 wherein the intermediate ester is washed with water to remove soluble salts therefrom.

6. A method according to claim 4 wherein the soap is derived from coconut oil and tallow and the alkoxy groups are derived from tallow alcohol.

7. A method according to claim 4 wherein the soap is derived from coconut oil and the alkoxy groups are derived from dodecyl alcohol.

8. A method which comprises heating about 1 mole of a compound of the formula $$R-S-CH_2-CHOH-CH_2-Cl$$

wherein R is an alkyl radical, with about 1.1 moles of a substantially anhydrous alkali metal soap containing about 8–18 carbon atoms at a temperature of about 160°–260° C. in an inert atmosphere to form an intermediate ester, and heating the intermediate with an aqueous alkali metal hydroxide.

9. A method according to claim 8 where R is dodecyl and the soap is a mixture of tallow soap and coconut oil soap.

No references cited.

CHARLES B. PARKER, *Primary Examiner.*

D. R. PHILLIPS, *Assistant Examiner.*